United States Patent [19]

Ames et al.

[11] Patent Number: 6,058,429

[45] Date of Patent: May 2, 2000

[54] METHOD AND APPARATUS FOR FORWARDING TRAFFIC BETWEEN LOCALITY ATTACHED NETWORKS USING LEVEL 3 ADDRESSING INFORMATION

[75] Inventors: Steve Ames, Westminster; Jan Bialkowski, Hopkinton, both of Mass.; Donal Byrne, Saratoga, Calif.; Dennis Cave, Acton, Mass.

[73] Assignee: Nortel Networks Corporation, Montreal, Canada

[21] Appl. No.: 08/569,580

[22] Filed: Dec. 8, 1995

[51] Int. Cl.[7] .............................. G06F 13/38; G06F 15/17
[52] U.S. Cl. ........................... 709/242; 370/399; 709/250
[58] Field of Search ........................ 395/200.01, 200.02, 395/200.06, 200.15, 311, 312, 200.3, 200.8, 200.54, 200.55, 200.68, 200.72; 370/401, 402, 399, 409; 709/200, 250, 224, 225, 238, 242

[56] References Cited

U.S. PATENT DOCUMENTS

| | | | |
|---|---|---|---|
| 4,677,588 | 6/1987 | Benjamin et al. ...................... | 364/900 |
| 5,241,682 | 8/1993 | Bryant et al. ............................ | 395/800 |
| 5,247,620 | 9/1993 | Fukuzawa et al. ..................... | 395/325 |
| 5,289,468 | 2/1994 | Yoshida .............................. | 395/200.54 |
| 5,301,273 | 4/1994 | Konishi .................................. | 395/200 |
| 5,329,618 | 7/1994 | Moati et al. ............................ | 395/200 |
| 5,343,471 | 8/1994 | Cassagnol ............................ | 370/85.13 |
| 5,351,237 | 9/1994 | Shinohara et al. ..................... | 370/58.3 |
| 5,396,493 | 3/1995 | Sugiyama .................................. | 370/60 |
| 5,420,862 | 5/1995 | Perlman ............................. | 370/85.13 |
| 5,454,296 | 10/1995 | Shimizu .................................. | 370/399 |
| 5,463,621 | 10/1995 | Suzuki .................................... | 370/399 |
| 5,519,858 | 5/1996 | Walton et al. ........................... | 395/600 |
| 5,526,351 | 6/1996 | Mochinaga et al. .................... | 370/399 |
| 5,539,881 | 7/1996 | Hunt et al. .......................... | 395/200.02 |
| 5,568,613 | 10/1996 | Futral .................................. | 395/200.02 |
| 5,588,119 | 12/1996 | Vincent et al. ..................... | 395/200.15 |
| 5,636,371 | 6/1997 | Yu ........................................... | 395/500 |
| 5,668,952 | 9/1997 | Slane .................................. | 395/200.54 |
| 5,719,864 | 2/1998 | Badger et al. ........................... | 370/399 |

OTHER PUBLICATIONS

Voelcker, J.; "Helping computers communicate"; IEEE Spectrum; vol. 23, No. 3; pp. 61–70. Mar. 1986.

*Primary Examiner*—Mark H. Rinehart
*Attorney, Agent, or Firm*—Blakely, Sokoloff, Taylor & Zafman LLP

[57] ABSTRACT

A method and apparatus for layer 3 switching packets between locally attached virtual local area networks without using a routing protocol are provided. A learning internetwork switch is connected between a router and a plurality of virtual local area networks. Communications between devices on the virtual local area networks and the router pass through the learning internetwork switch. By inspecting certain packets that flow between the devices and the router, the learning internetwork switch learns the location of the devices without having to use a routing protocol. The learning internetwork switch learns the network layer and the data link layer addresses of the various devices. Once the learning internetwork switch has learned the location, the network layer address and data link layer address of a device, the learning internetwork switch can forward packets between devices on different virtual local area networks using layer 3 switching without involving the router.

16 Claims, 10 Drawing Sheets

METHOD AND APPARATUS FOR FORWARDING TRAFFIC BETWEEN LOCALITY ATTACHED NETWORKS USING LEVEL 3 ADDRESSING INFORMATION

FIELD OF THE INVENTION

The present invention relates to network communications, and more specifically, to a switch configured to learn the network layer addresses of a plurality of locally attached virtual local area networks.

BACKGROUND OF THE INVENTION

Large computer network systems are often logically partitioned into numerous smaller networks, referred to as subnets, virtual local area networks or VLANs. Referring to FIG. 1, it is a block diagram of a network system 100 that has been logically partitioned into three VLANs: VLAN 102, VLAN 110 and VLAN 118. VLAN 102 includes a server 104 and two clients 106 and 108. VLAN 110 includes a server 112 and two clients 114 and 116. VLAN 118 includes a server 120 and two clients 122 and 124. The members of each VLAN communicate with each other through a hub or switch. In the illustrated example, the members of VLANs 102, 110 and 118 communicate with each other through switches 134, 136, and 138, respectively.

All messages sent between members of a given VLAN are sent at the data link layer (level two) of the ISO reference model. Messages sent between VLANs are routed at the network layer (level three) of the ISO reference model. Control information is transmitted with a packet to indicate the device that sent the packet, the device that is to receive the packet, and the protocol-type of the packet. A packet sent between VLANs may include, for example, control information that indicates the protocol-type (PT) of the packet, the data link layer address of the source device (SA), the data link layer address of the destination device (DA), the network layer address of the source device (SNLA), and the network layer address of the destination device (DNLA).

The larger network system 100 is formed by connecting the VLANs to each other through a router 126. Specifically, VLANs 102, 110 and 118 are respectively connected to ports 130, 128 and 132 of router 126. Because the VLANs are connected to each other through router 126, the members of each VLAN are able to communicate with members of other VLANs that are part of the larger network system 100. However, a different mechanism is used to communicate between members of different VLANs than is used to communicate between members of the same VLAN.

TYPICAL INTRA-VLAN COMMUNICATION

Within a given VLAN, each device has a unique data link layer address (L2 address). Before one member of a VLAN can communicate with another member of the same VLAN, it must determine the L2 address of the device with which it desires to communicate. Consider a typical intra-VLAN communication where client 106 desires to send a message to server 104. Initially, client 106 knows the network layer address (L3 address) of server 104, but does not know the L2 address of server 104. To obtain the L2 address of server 104, client 106 transmits a request for the L2 address of server 104. The request includes the L3 address of server 104, and specifies the L2 address of client 106 as the "source address" of the request. Such requests are referred to as Address Resolution Protocol queries ("ARP queries").

Switch 134 receives the ARP query from client 106 and broadcasts the ARP query to all members of VLAN 102. Server 104 receives the broadcasted ARP query and replies by sending a message that contains its L2 address to client 106 through switch 134. The server 104 is able to address the reply message directly to client 106 using the L2 address of client 106 that was contained in the ARP query. A reply message to an ARP query is referred to as an ARP response. The ARP response is transmitted from server 104 to client 106 through switch 134. Client 106 receives the ARP response and transmits the message to server 104 through switch 134 in a packet that specifies the L2 address of server 104 as the destination address and the L2 address of client 106 as the source address.

TYPICAL INTER-VLAN COMMUNICATION

A typical inter-VLAN communication is more complicated. Assume, for example, that client 114 desires to send a message to server 104. Initially, client 114 is aware of the L3 address of server 104. Based on the L3 address, client 114 is able to determine that server 104 does not belong to the same VLAN as client 114. Upon determining that server 104 is on a different VLAN than client 114, client 114 sends an ARP query that requests the L2 address of the default gateway.

Router 126 receives the ARP query at port 128 and responds by transmitting an ARP response to client 114 that contains the L2 address of port 128. Client 114 then transmits the message to router 126 by specifying the L2 address of port 128 as the L2 destination address for the message. The message also contains control information that specifies a Destination Network Level Address ("DNLA"). In the present example, the L3 address of server 104 is the DNLA specified in the control information of the message.

Router 126 receives the message from client 114 and uses the L3 address of server 104 to look up the outbound port that connects router 126 to server 104. Router 126 will have previously acquired this information using a routing protocol. In the present example, router 126 would determine that port 130 connects to the VLAN containing server 104. Router 126 then transmits an ARP query through port 130 to VLAN 102 requesting the address of server 104. The ARP query specifies the L2 address of port 130 as the source address, and includes the L3 address of server 104. The switch 134 of VLAN 102 broadcasts the ARP query to all members of VLAN 102.

Server 104 responds to the ARP query by transmitting an ARP response that contains its L2 address. The destination address specified in the ARP response is the L2 address of port 130. When router 126 receives the ARP response through port 130, router 126 forwards to server 104 the message that was originally sent from client 114. This is accomplished by encapsulating the message in a packet that specifies the L2 address of port 130 as the source address and the L2 address of server 104 as the destination address, and then sending the packet to VLAN 102 through port 130.

The inter-VLAN communication technique described above has some significant disadvantages. For example, all client-server traffic that requires inter-VLAN communication must traverse the router. However, conventional routers have throughput and latency limitations for client-server operations. As a result, client-server operations that use intra-VLAN communications are generally performed faster than the same operations using inter-VLAN communications. Another disadvantage is that router ports are relatively expensive. Therefore, network costs can increase dramatically with an increase in the number of router ports required to support inter-VLAN communication.

SUMMARY OF THE INVENTION

A method and apparatus for forwarding packets between locally attached virtual local area networks are provided. A learning internetwork switch is connected between a router and a plurality of virtual local area networks. Communications between devices on the virtual local area networks and the router pass through the learning internetwork switch. By inspecting the packets that flow between the devices and the router, the learning internetwork switch determines the location of the devices without having to use a routing protocol. The learning internetwork switch learns the data link layer addresses and network layer addresses of the various devices. Once the learning internetwork switch has learned the location (port), the data link layer address of a device, and the network layer address of a device, the learning internetwork switch can forward packets between different virtual local area networks using network layer switching without involving the router.

The learning internetwork switch contains a connection to each virtual local area network and a corresponding connection to the router. All traffic between the devices in the VLANs and the router must pass through the learning internetwork switch. The learning mechanism inspects certain packets sent between the router and the communicating devices and stores data indicating the port location of each device based on information contained in the certain packets.

According to one embodiment, the learning mechanism is further configured to store data indicating a correspondence between data link layer addresses of the devices and network layer addresses of the devices based on information contained in the certain packets.

According to an embodiment, the learning internetwork switch includes a proxy forwarding mechanism. The proxy forwarding mechanism detects when a packet sent by a first device of a first virtual local area network contains (1) a data link layer destination address associated with the router and (2) a network layer destination address associated with a second device of a second virtual local area network in the set of virtual local area networks.

The proxy forwarding mechanism determines the data link layer address of the second device based on the network layer address of the second device and replaces in the packet the data link layer destination address associated with the router with the data link layer address associated with the second device. The proxy forwarding mechanism then transmits the packet through the port to which the second device is connected.

A method, for use by a learning internetwork switch connected to a router, for determining locations of devices that belong to a set of virtual local area networks locally attached to the learning internetwork switch is also provided. According to the method, a packet from a device that belongs to one of the virtual local area networks is receiving at a first port of the learning internetwork switch.

It is determined whether the packet is a request for the data link layer address of the particular port of the router. If the packet is a request for the data link layer address of the particular port of the router, then a data link layer source address and a network layer source address are read from the packet. Data indicating that the data link layer source address corresponds to the network layer source address is stored. Data indicating that the device that originally transmitted the packet is connected to the first port is also stored. The packet is then forwarded to the particular port of the router.

If the packet contains a message to be sent through the router to a second device that belongs to a second virtual local area network of the set of virtual local area networks, then a network layer destination address associated with the second device is read from the packet. A lookup operation is performed to determine if configuration information has been stored for the network layer destination address. If configuration information has been stored for the network layer destination address, then the configuration information is read to determine a data link layer address of the second device and that the second device is connected to a second port of the learning internetwork switch. The packet is forwarded to the second device through the second port.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3b is a portion of the flow chart of FIG. 3a;

FIG. 4b is a portion of the flow chart of FIG. 4a;

FIG. 6b is a portion of the flow chart of FIG. 6a.

DETAILED DESCRIPTION OF THE PREFERRED EMBODIMENT

Figure 1:
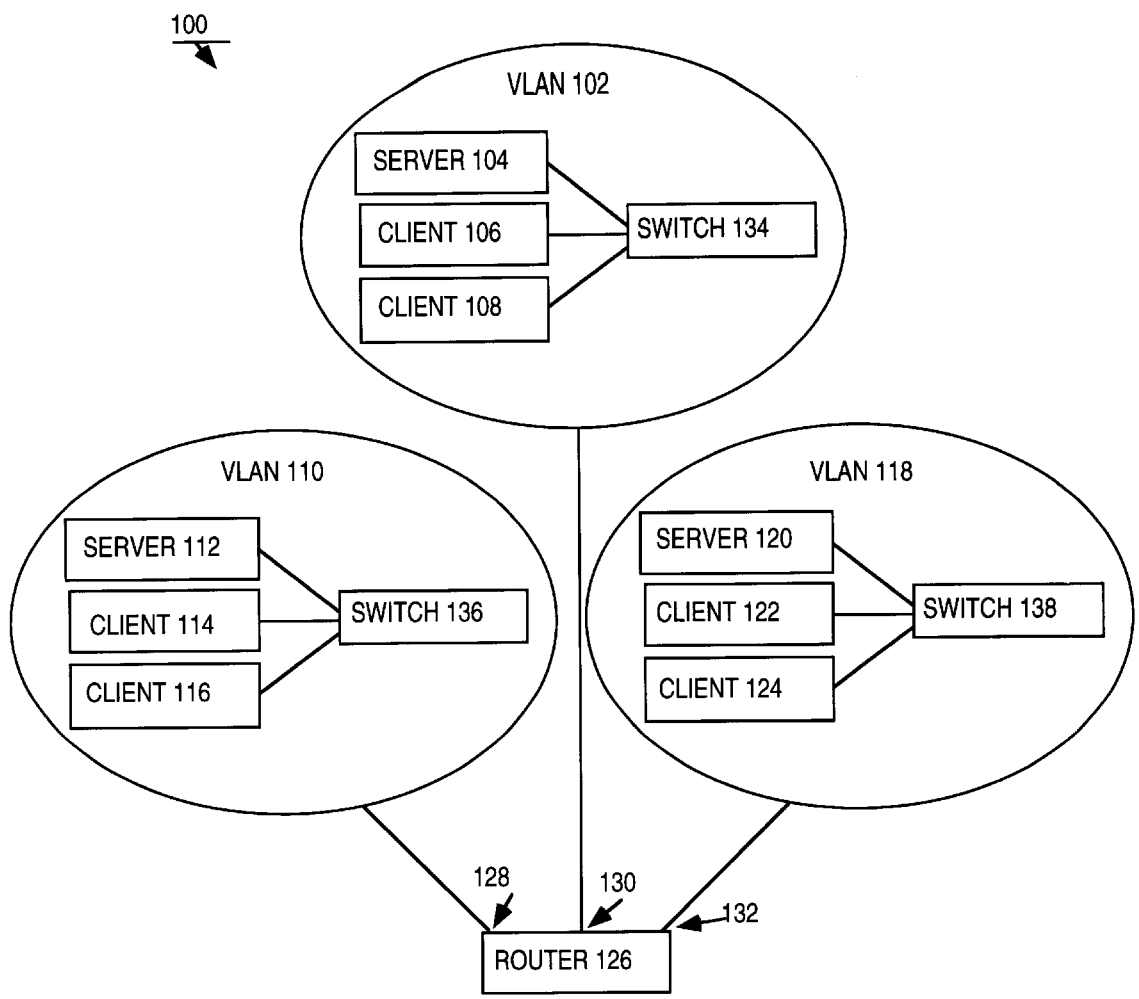
FIG. 1 is a block diagram of a prior art network system in which all inter-VLAN communication is performed through a router.
Figure 2:
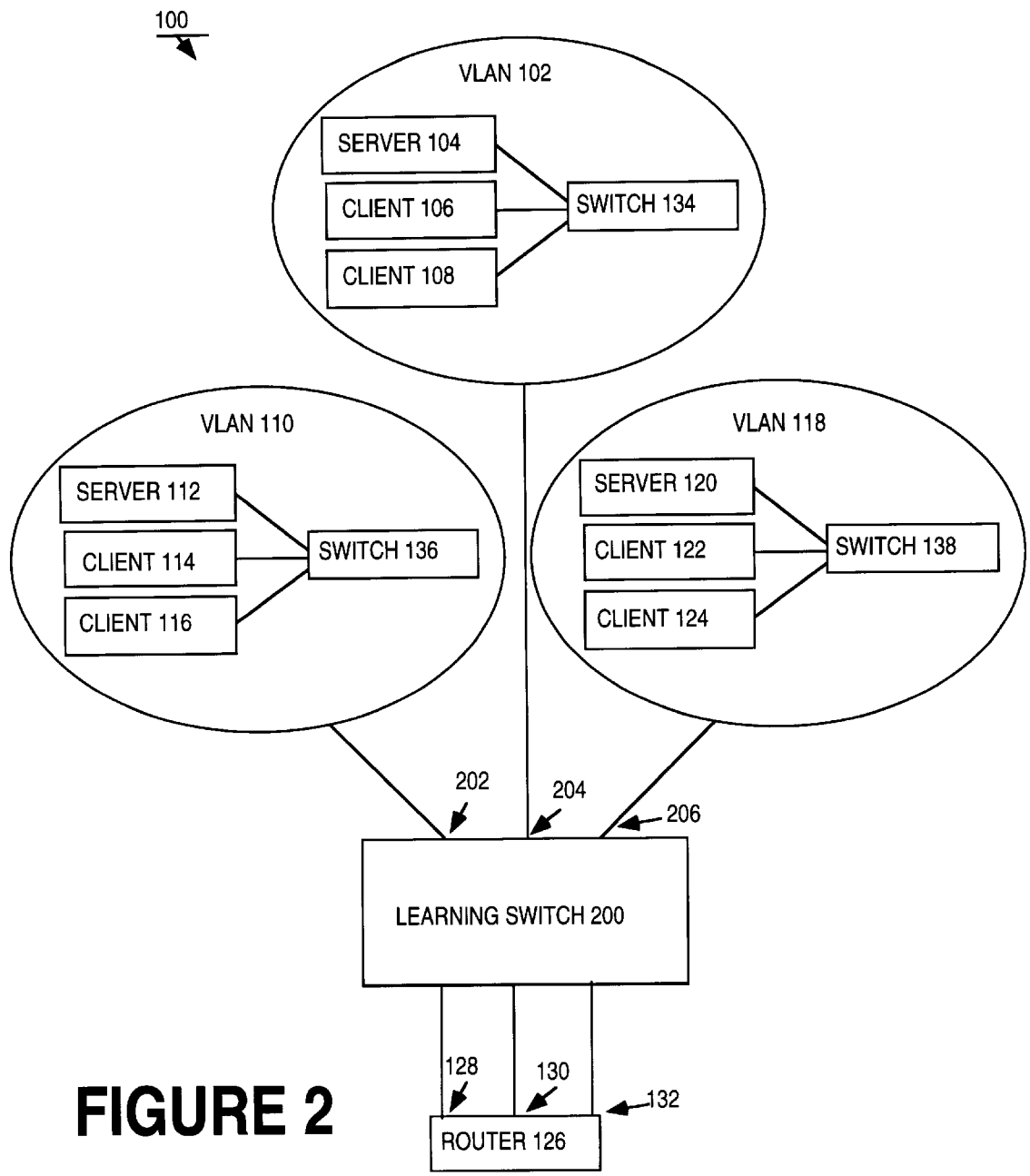
FIG. 2 is a block diagram of a network system that includes a learning internetwork switch configured to perform proxy forwarding according to an embodiment of the invention.

Referring to FIG. 2, it is a block diagram illustrating the network system 100 of FIG. 1 with the addition of a learning internetwork switch 200 according to an embodiment of the invention. As shall be described in greater detail below, learning internetwork switch 200 is a device for forwarding traffic between locally attached VLANs using L3 addresses. Learning internetwork switch 200 generates a table that reflects the correlation between L2 and L3 addresses based on information learned from inspecting certain packets (e.g. ARP queries and ARP responses) sent between router 126 and the members of the various VLANs 102, 110 and 118. The learning process is performed without impacting either the current configuration of the routers in the network or the network layer address assignment.

For the purposes of explanation, the invention shall be described with reference to packets transmitted according to the Internet Protocol (IP). However, the present invention is not limited to any particular protocol. The information contained in the packets inspected by the learning internetwork switch 200 will vary depending on the protocol used in the network. The scope of present invention includes learning internetwork switches configured to take into account such variations. The design and operation of such switches will be evident to one skilled in the art upon reading the following description.

In the following discussion, it shall be explained how learning internetwork switch 200 learns the correspondence between L2 and L3 addresses when a message is sent from one device (SOURCE-DEV) that belongs to one VLAN (SOURCE-VLAN) to another device (DEST-DEV) that belongs to another VLAN (DEST-VLAN). The L2 and L3 addresses of SOURCE-DEV shall be referred to hereafter as SDL2 and SDL3, respectively, and the L2 and L3 addresses of DEST-DEV shall be referred to hereafter as DDL2 and DDL3, respectively. The L2 and L3 addresses of the port of router 126 that is serving as the default gateway of the SOURCE-VLAN (DG) shall be referred to hereafter as DGL2 and DGL3, respectively.

Figure 3A:
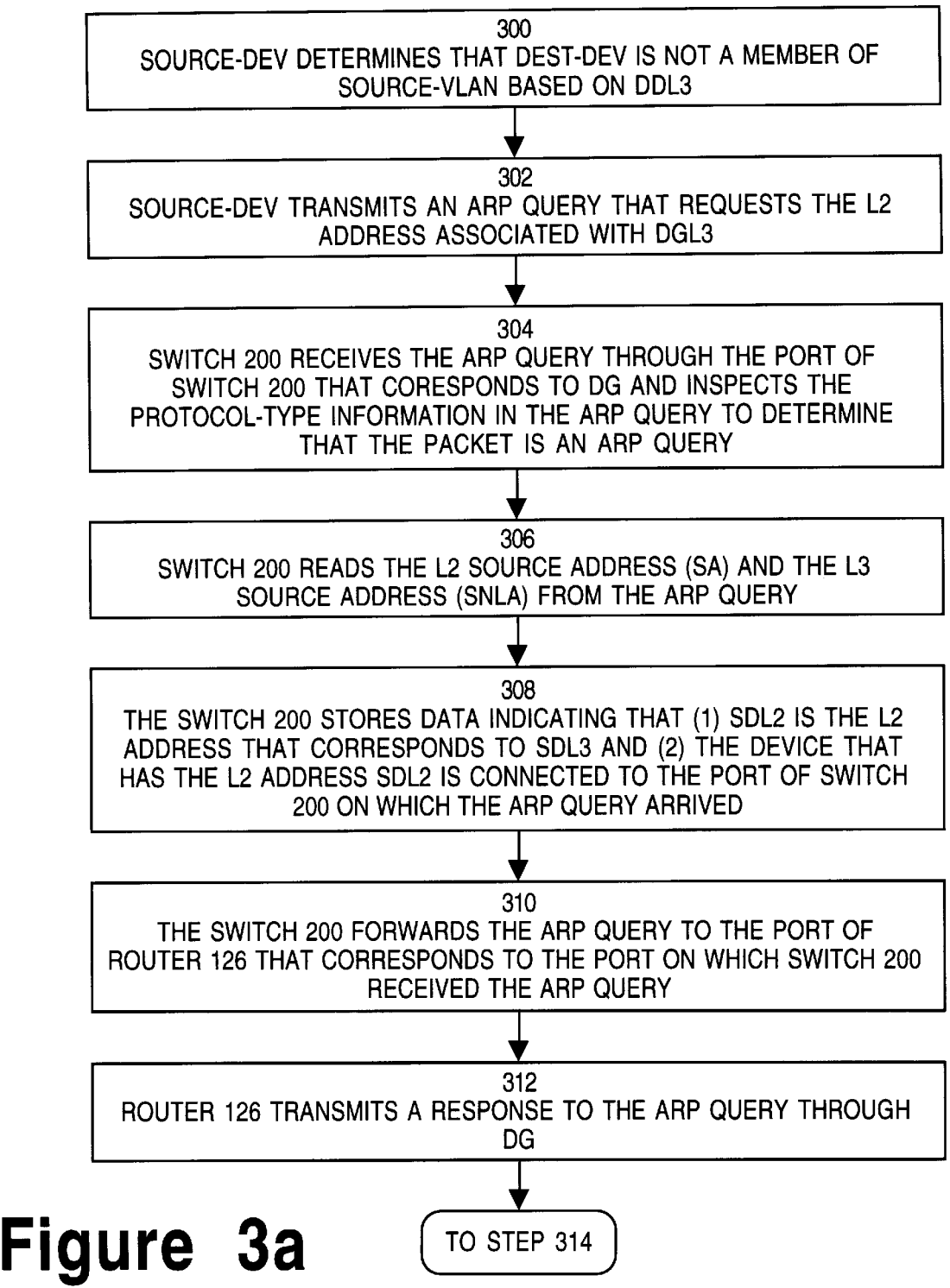
FIG. 3a is a portion of a flow chart illustrating how the learning internetwork switch learns configuration information during the communication that takes place between when a source device requests the data link layer address of the default gateway port of a router.
Figure 3B:
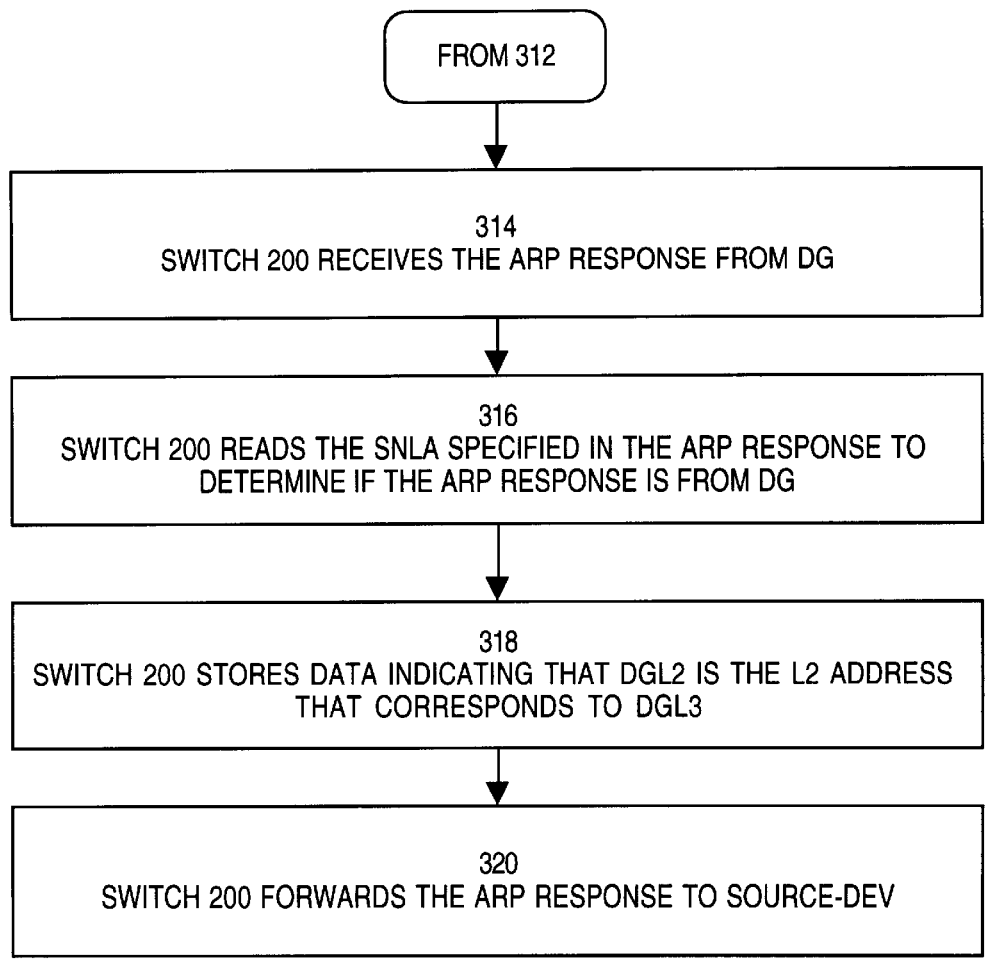
Figure 4A:
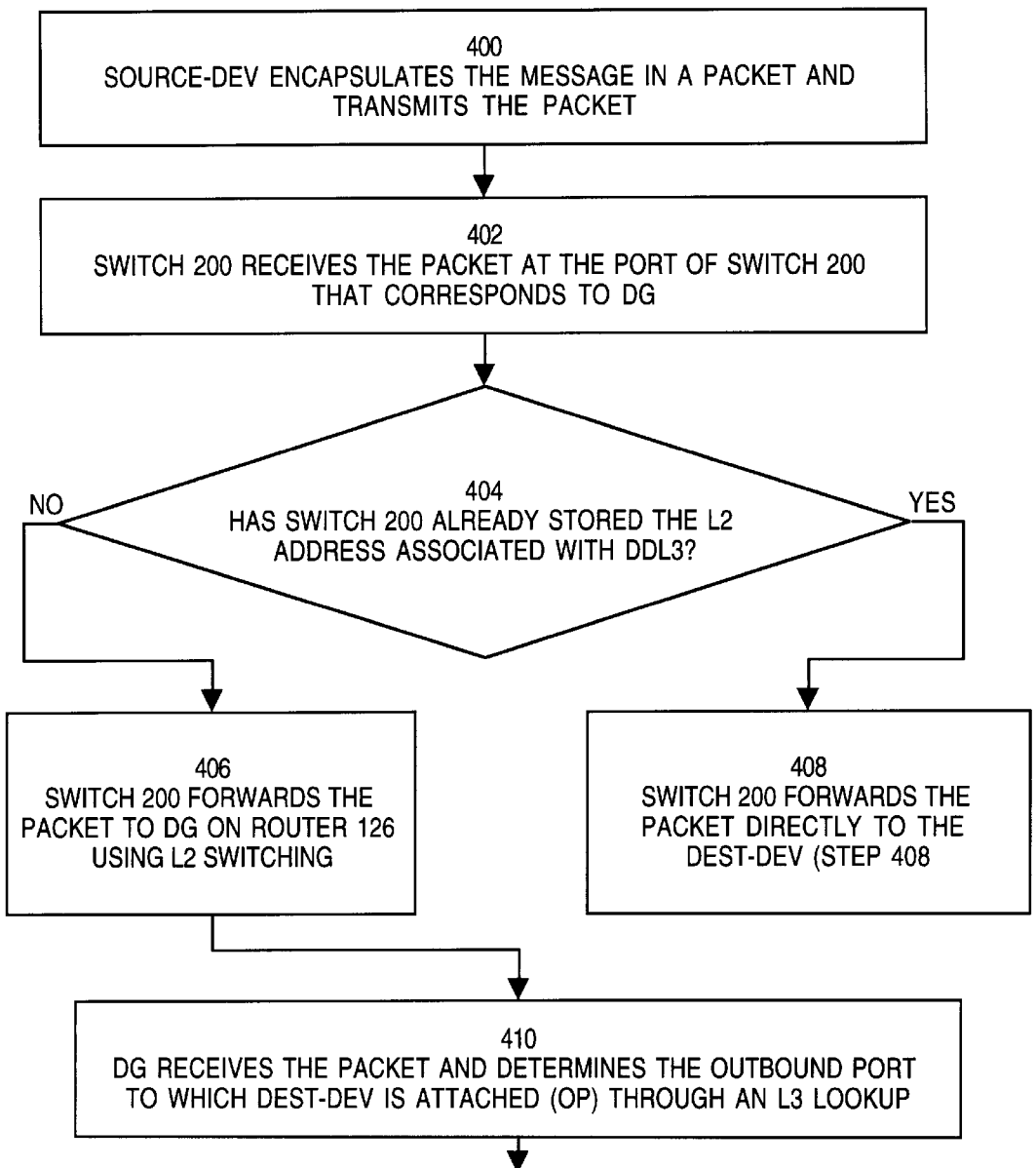
FIG. 4a is a portion of a flow chart illustrating how the learning internetwork switch learns configuration information as an internetwork message is forwarded by a router to a destination device.
Figure 4B:
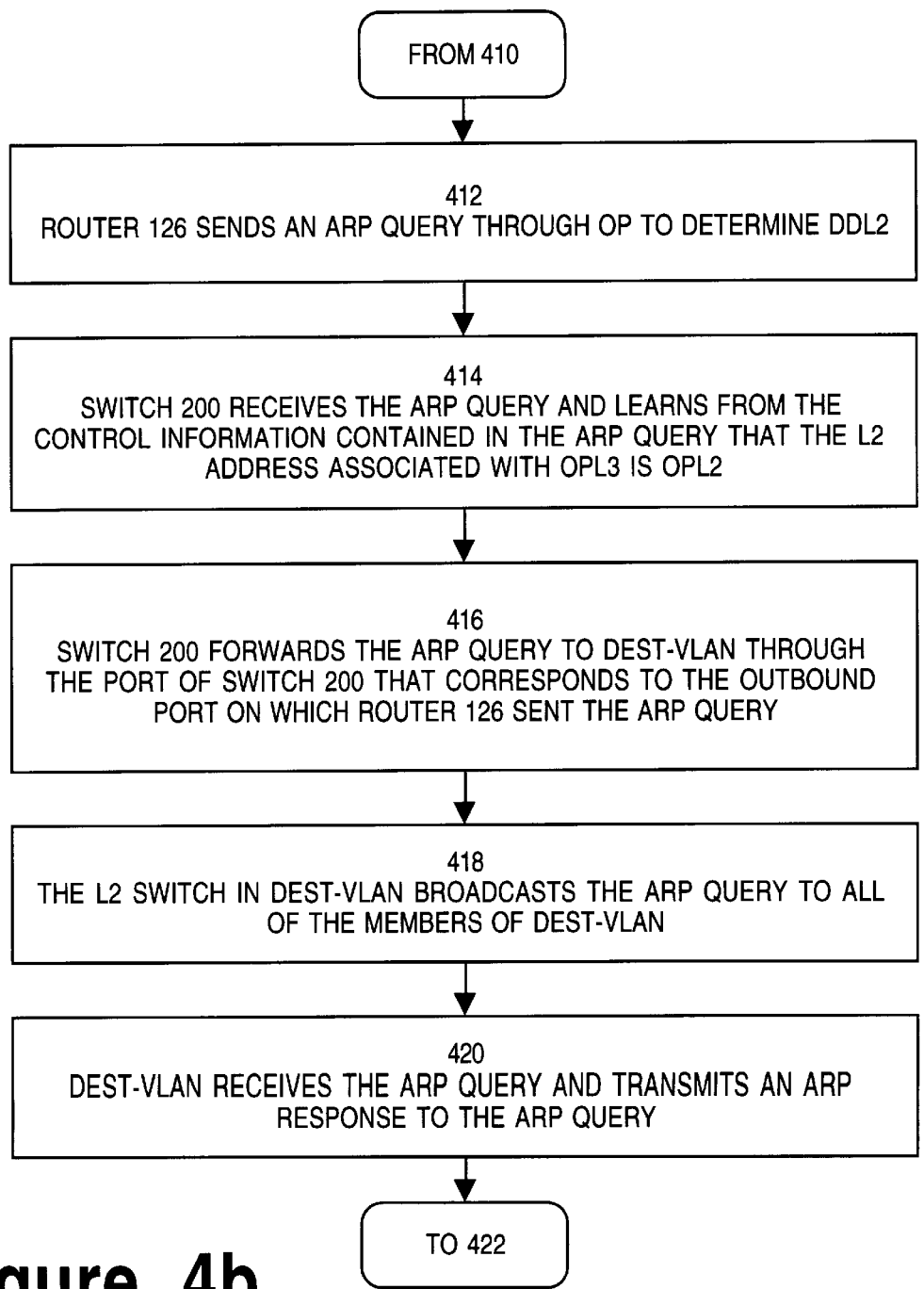
Figure 4C:
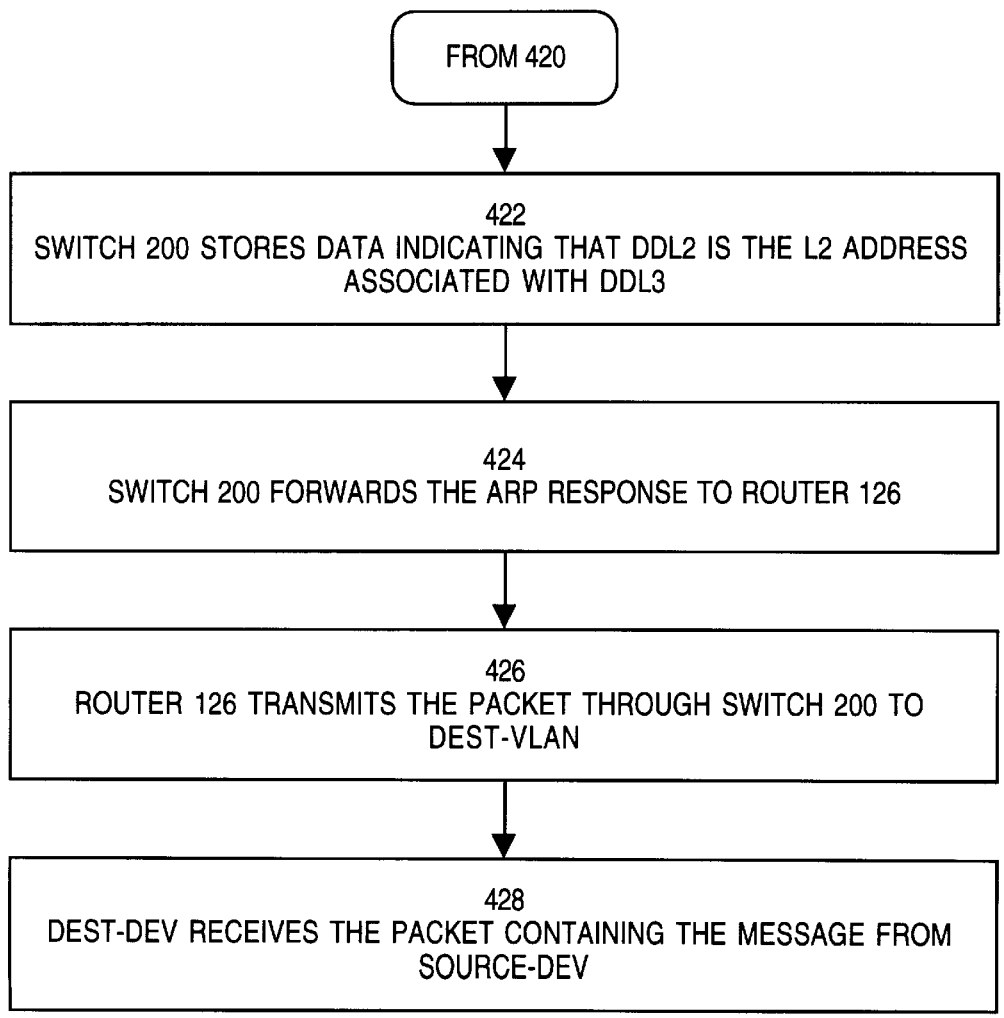
FIG. 4c is a portion of the flow chart of FIG. 4b.

From the perspective of the device transmitting a message, the process of transmitting a packet to a device in another VLAN is not affected by the presence of learning internetwork switch 200. Thus, the SOURCE-DEV must (1) determine the L2 address of the default gateway, and (2) transmit the message to the default gateway in a packet that specifies the L3 address of the destination device. FIGS. 3a and 3b are a flow chart illustrating the steps performed by the various devices of network system 100 while the source device determines the L2 address of the destination device. FIGS. 4a, 4b and 4c are a flow chart illustrating the steps performed by the various devices of network system 100 when the source device transmits the message to the default gateway.

DETERMINING THE L2 ADDRESS OF THE DEFAULT GATEWAY

Initially, SOURCE-DEV knows DDL3 and DGL3 but does not know DDL2 or DGL2. At step 300, SOURCE-DEV determines that DEST-DEV is not a member of SOURCE-VLAN based on DDL3. Because DEST-DEV is not a member of SOURCE-VLAN, SOURCE-DEV knows that the message to DEST-DEV must be sent through DG. For example, assume that client 114 desires to send a message to server 104. Initially, client 114 knows the L3 address of server 104 and the L3 address of port 128 but does not know DDL2 nor the L2 address of port 128. At step 300, client 114 determines that server 104 is not a member of VLAN 110 based on the L3 address of server 104. Because server 104 is not a member of VLAN 110, client 114 knows that the message to server 104 must be sent through port 128.

To obtain DGL2, SOURCE-DEV transmits an ARP query that requests the L2 address associated with DGL3 (step 302). The destination address specified in the ARP query is a special L2 address that indicates that the message is to be broadcast to all devices on SOURCE-VLAN. Upon receiving the ARP query, the L2 switch of the SOURCE-VLAN broadcasts the ARP query to all members of SOURCE-VLAN. The router port that is serving as the default gateway of a VLAN is a member of the VLAN to which the port is connected. Therefore, the L2 switch of the SOURCE-VLAN will broadcast the ARP query to DG.

Continuing with the present example, client 114 transmits an ARP query that requests the L2 address associated with the L3 address of port 128 at step 302. The destination address specified in the ARP query is a special L2 address that indicates that the message is to be broadcast to all devices on VLAN 110. Upon receiving the ARP query, the switch 136 broadcasts the ARP query to all members of VLAN 110. Port 128, which is serving as the default gateway of a VLAN 110 is a member of VLAN 110. Therefore, switch 136 will broadcast the ARP query to port 128.

As illustrated in FIG. 2, all communications between VLANs 102, 110 and 118 and router 126 flow through learning internetwork switch 200. Specifically, ports 202, 204 and 206 of learning internetwork switch 200 correspond to ports 128, 130 and 132 of router 126, respectively. All messages sent from VLANs 110, 102 and 118 are received at ports 202, 204 and 206 of learning internetwork switch 200, respectively, prior to being forwarded to the corresponding ports of router 126. For example, messages sent by members of VLAN 110 to port 128 will arrive at port 202 of learning internetwork switch 200 prior to being forwarded by the switch to port 128 of router 126. Similarly, messages from VLANs 102 and 118 will arrive at ports 204 and 206 of learning internetwork switch 200, prior to being forwarded to ports 130 and 132 of router 126. In addition, messages sent through ports 128, 130 and 132 of router 126 pass through learning internetwork switch 200 prior to being forwarded to VLANs 110, 102 and 118, respectively.

At step 304, learning internetwork switch 200 receives the ARP query through the port of learning internetwork switch 200 that corresponds to DG and inspects the protocol-type information in the ARP query to determine that the packet is an ARP query. In response to detecting that the packet is an ARP query, learning internetwork switch 200 reads the L2 source address (SA) and the L3 source address (SNLA) from the ARP query (step 306). The SA and SNLA specified in the ARP query will be SDL2 and SDL3, respectively. At step 308, the learning internetwork switch 200 stores data indicating that SDL2 is the L2 address that corresponds to SDL3. Learning internetwork switch 200 also stores data indicating that the device that has the L2 address SDL2 is connected to the port of learning internetwork switch 200 on which the ARP query arrived.

Continuing again with the present example, at step 304, learning internetwork switch 200 receives the ARP query through port 202, which corresponds to port 128. Learning internetwork switch 200 reads the L2 source address (SA) and the L3 source address (SNLA) from the ARP query at step 306. The SA and SNLA specified in the ARP query will be the L2 address of client 114 and the L3 address of client 114, respectively. At step 308, the learning internetwork switch 200 stores data indicating that the L2 address of client 114 is the L2 address that corresponds to the L3 address of client 114. Learning internetwork switch 200 also stores data indicating that client 114 is connected to the port of learning internetwork switch 200 on which the ARP query arrived.

At step 310, the learning internetwork switch 200 forwards the ARP query to the port of router 126 that corresponds to the port on which learning internetwork switch 200 received the ARP query. For example, if learning internetwork switch 200 received the ARP query at port 202, then learning internetwork switch 200 forwards the ARP query to port 128 of router 126. If learning internetwork switch 200 received the ARP query at port 204, then learning internetwork switch 200 forwards the ARP query to port 130 of router 126. If learning internetwork switch 200 received the ARP query at port 206, then learning internetwork switch 200 forwards the ARP query to port 132 of router 126. In the present example, the ARP query that is broadcast over VLAN 110 arrives at port 202, and is therefore forwarded by learning internetwork switch 200 to port 128 of router 126.

At step 312, router 126 transmits a response to the ARP query through DG, which will be the same port of router 126 on which the ARP query was received. The data link layer destination address (DA) specified in the ARP response is SDL2. The data link layer source address (SA) specified in the ARP response is DGL2. The protocol-type (PT) specified in the ARP response indicates that the packet is an ARP response. The network layer source address (SNLA) specified in the ARP response is DGL3. The network layer destination address (DNLA) specified in the ARP response is SDL3.

In the present example, router 126 transmits a response to the ARP query through port 128 at step 312. The data link layer destination address (DA) specified in the ARP response is the L2 address of client 114. The data link layer source address (SA) specified in the ARP response is the L2 address of port 128. The protocol-type (PT) specified in the ARP response indicates that the packet is an ARP response. The network layer source address (SNLA) specified in the ARP response is the L3 address of port 128. The network layer destination address (DNLA) specified in the ARP response is the L3 address of client 114.

At step 314, learning internetwork switch 200 receives the ARP response from DG. At step 316, learning internetwork switch 200 reads the SNLA specified in the ARP response to determine if the ARP response is from DG. At step 318, learning internetwork switch 200 stores data indicating that DGL2 is the L2 address that corresponds to DGL3. At step 320, learning internetwork switch 200 forwards the ARP response to SOURCE-DEV. SOURCE-DEV receives the ARP response and reads the DGL2 from the ARP response.

Returning to the present example, learning internetwork switch 200 receives the ARP response from port 128 at step 314. At step 316, learning internetwork switch 200 reads the SNLA specified in the ARP response to determine if the ARP response is from port 128. At step 318, learning internetwork switch 200 stores data indicating that the L2 address of port 128 is the L2 address that corresponds to the L3 address of port 128. At step 320, learning internetwork switch 200 forwards the ARP response to client 114. Client 114 receives the ARP response and reads the L2 address of port 128 from the ARP response.

TRANSMITTING A MESSAGE TO THE DEFAULT GATEWAY

Having acquired DGL2 through the process described above, SOURCE-DEV has the information it requires to transmit the message to DEST-DEV through DG. FIGS. 4*a*, 4*b* and 4*c* are a flow chart illustrating the steps performed by the various devices within the network system 100 as SOURCE-DEV attempts to transmit the message to DEST-DEV.

At step 400, SOURCE-DEV encapsulates the message in a packet and transmits the packet. The data link layer destination address (DA) specified in the packet is DGL2. The data link layer source address (SA) specified in the packet is SDL2. The protocol-type (PT) specified in the packet indicates that the packet is an Internet Protocol (IP) packet. The network layer source address (SNLA) specified in the packet is SDL3. The network layer destination address (DNLA) specified in the packet is DDL3. Based on the DA contained in this control information, the L2 switch of SOURCE-VLAN transmits the packet to DG.

Retuning to the example in which client 114 is transmitting an inter-VLAN message to server 104, client 114 encapsulates the message in a packet and transmits the packet at step 400. The data link layer destination address (DA) specified in the packet is the L2 address of port 128. The data link layer source address (SA) specified in the packet is the L2 address of client 114. The protocol-type (PT) specified in the packet indicates that the packet is an Internet Protocol (IP) packet. The network layer source address (SNLA) specified in the packet is the L3 address of client 114. The network layer destination address (DNLA) specified in the packet is the L3 address of server 104. Based on the DA contained in this control information, the switch 136 transmits the packet to port 128.

At step 402, learning internetwork switch 200 receives the packet at the port of learning internetwork switch 200 that corresponds to DG. After receiving the packet, learning internetwork switch 200 reads the control information to determine that the packet is destined for DG and that the protocol-type of the packet is IP. At step 404, learning internetwork switch 200 determines whether it has already stored the L2 address associated with DDL3. In the present example, learning internetwork switch 200 has not yet stored the L2 address associated with DDL3. Therefore, control passes to step 406. If switch had stored the L2 address associated with DDL3, learning internetwork switch 200 would forward the packet directly to the DEST-DEV (step 408), thereby circumventing the use of router 126. The process of forwarding inter-VLAN packets without involving router 126, referred to as proxy forwarding, shall be described in greater detail below.

Returning to the present example, learning internetwork switch 200 receives the packet at port 202 at step 402. After receiving the packet, learning internetwork switch 200 reads the control information to determine that the packet is destined for port 128 and that the protocol-type of the packet is IP. At step 404, learning internetwork switch 200 determines whether it has already stored the L2 address associated with the L3 address of server 104. In the present example, learning internetwork switch 200 has not yet stored the L2 address associated with the L3 address of server 104. Therefore, control passes to step 406. If switch had stored the L2 address associated with the L3 address of server 104, learning internetwork switch 200 would forward the packet directly to the server 104 (step 408), thereby circumventing the use of router 126.

At step 406, learning internetwork switch 200 forwards the packet to DG on router 126 using L2 switching. At step 410, DG receives the packet and determines the outbound port to which DEST-DEV is attached (OP) through an L3 lookup. Router 126 has previously acquired the location of DEST-DEV using a routing protocol, such as Routing Information Protocol (RIP) or Open Shortest Path First (OSPF).

Returning to the present example, learning internetwork switch 200 forwards the packet to port 128 on router 126 using L2 switching at step 406. At step 410, port 128 receives the packet and determines, by performing an L3 lookup, that server 104 is attached to port 130. Router 126 has previously acquired the location of server 104 using a routing protocol.

At step 412, router 126 sends an ARP query through OP to determine DDL2. The data link layer source address (SA) specified in the ARP query is the L2 address of OP (OPL2). The protocol-type (PT) indicates that the query is an ARP query. The network layer source address (SNLA) specified in the ARP query is the L3 address of OP (OPL3). The network layer destination address (DNLA) specified in the ARP query is DDL3.

In the present example, router 126 sends an ARP query through port 130 to determine the L2 address of server 104 (step 412). The data link layer source address (SA) specified in the ARP query is the L2 address of port 130. The protocol-type (PT) indicates that the query is an ARP query. The network layer source address (SNLA) specified in the ARP query is the L3 address of port 130. The network layer destination address (DNLA) specified in the ARP query is the L3 address of server 104.

At step 414, learning internetwork switch 200 receives the ARP query and learns from the control information contained in the ARP query that the L2 address associated with OPL3 is OPL2. At step 416, learning internetwork switch 200 forwards the ARP query to DEST-VLAN through the port of learning internetwork switch 200 that corresponds to the outbound port on which router 126 sent the ARP query. At step 418, the L2 switch in DEST-VLAN broadcasts the ARP query to all of the members of DEST-VLAN.

In the present example, learning internetwork switch 200 receives the ARP query and learns from the control information contained in the ARP query that the L2 address associated with the L3 address of port 130 is the L2 address of port 130 (step 414). At step 416, learning internetwork switch 200 forwards the ARP query to VLAN 102 through port 204. At step 418, switch 134 broadcasts the ARP query to all of the members of VLAN 102.

At step 420, DEST-DEV receives the ARP query and transmits an ARP response to the ARP query. The ARP response specifies that DDL2 is the L2 address associated with DDL3. At step 422, the learning internetwork switch 200 receives the ARP response from DEST-DEV and stores data indicating that DDL2 is the L2 address associated with DDL3. Learning internetwork switch 200 also stores data that indicates that the device with the address DDL2 is connected to the port of learning internetwork switch 200 on which the ARP response was received.

In the present example, server 104 receives the ARP query and transmits an ARP response to the ARP query (step 420). The ARP response specifies that the L2 address of server 104 is the L2 address associated with the L3 address of server 104. At step 422, the learning internetwork switch 200 receives the ARP response from server 104 and stores data indicating that the L2 address of server 104 is the L2 address associated with the L3 address of server 104. Learning internetwork switch 200 also stores data that indicates that the device with the L2 address of server 104 is connected to port 204.

At step 424, learning internetwork switch 200 forwards the ARP response to router 126. At step 426, router 126 transmits the packet through learning internetwork switch 200 to DEST-VLAN. The data link layer destination address (DA) specified in the packet is DDL2. The data link layer source address (SA) specified in the packet is the L2 address of the port of router 126 that connects router 126 to DEST-VLAN. The protocol-type (PT) specified in the packet indicates that the packet is an Internet Protocol (IP) packet. The network layer source address (SNLA) specified in the packet is SDL3. The network layer destination address (DNLA) specified in the packet is DDL3. Based on this control information, the L2 switch in DEST-VLAN sends the message to DEST-DEV. At step 428, DEST-DEV receives the packet containing the message from SOURCE-DEV.

In the present example, the data link layer destination address (DA) specified in the packet is the L2 address of server 104. The data link layer source address (SA) specified in the packet is the L2 address of port 130. The protocol-type (PT) specified in the packet indicates that the packet is an Internet Protocol (IP) packet. The network layer source address (SNLA) specified in the packet is the L3 address of client 114. The network layer destination address (DNLA) specified in the packet is the L3 address of server 104. Based on this control information, the switch 134 sends the message to server 104. At step 428, server 104 receives the packet containing the message that was originally sent from client 114.

PROXY FORWARDING

During the process described above, SOURCE-DEV, DEST-DEV and router 126 behaved exactly as they would if learning internetwork switch 200 did not exist. Thus, the presence of learning internetwork switch 200 is completely transparent to all of the devices involved in inter-VLAN communications. During the inter-VLAN communication, learning internetwork switch 200 learned (1) that the L2 address corresponding to SDL3 is SDL2, (2) which port of learning internetwork switch 200 is connected to SOURCE-DEV, (3) that the L2 address corresponding to DDL3 is DDL2, (4) which port of learning internetwork switch 200 is connected to DEST-DEV, (5) that the L2 address of DG is DGL2, and (6) that the L2 address of OP is OPL2. In the specific example in which client 114 sent a message to server 104, learning internetwork switch 200 learned (1) that the L2 address corresponding to the L3 address of client 114 is the L2 address of client 114, (2) that port 202 is connected to client 114, (3) that the L2 address corresponding to the L3 address of server 104 is the L2 address of server 104, (4) that port 204 is connected to server 104, (5) the L2 address of port 128, and (6) the L2 address of port 130.

Figure 5:
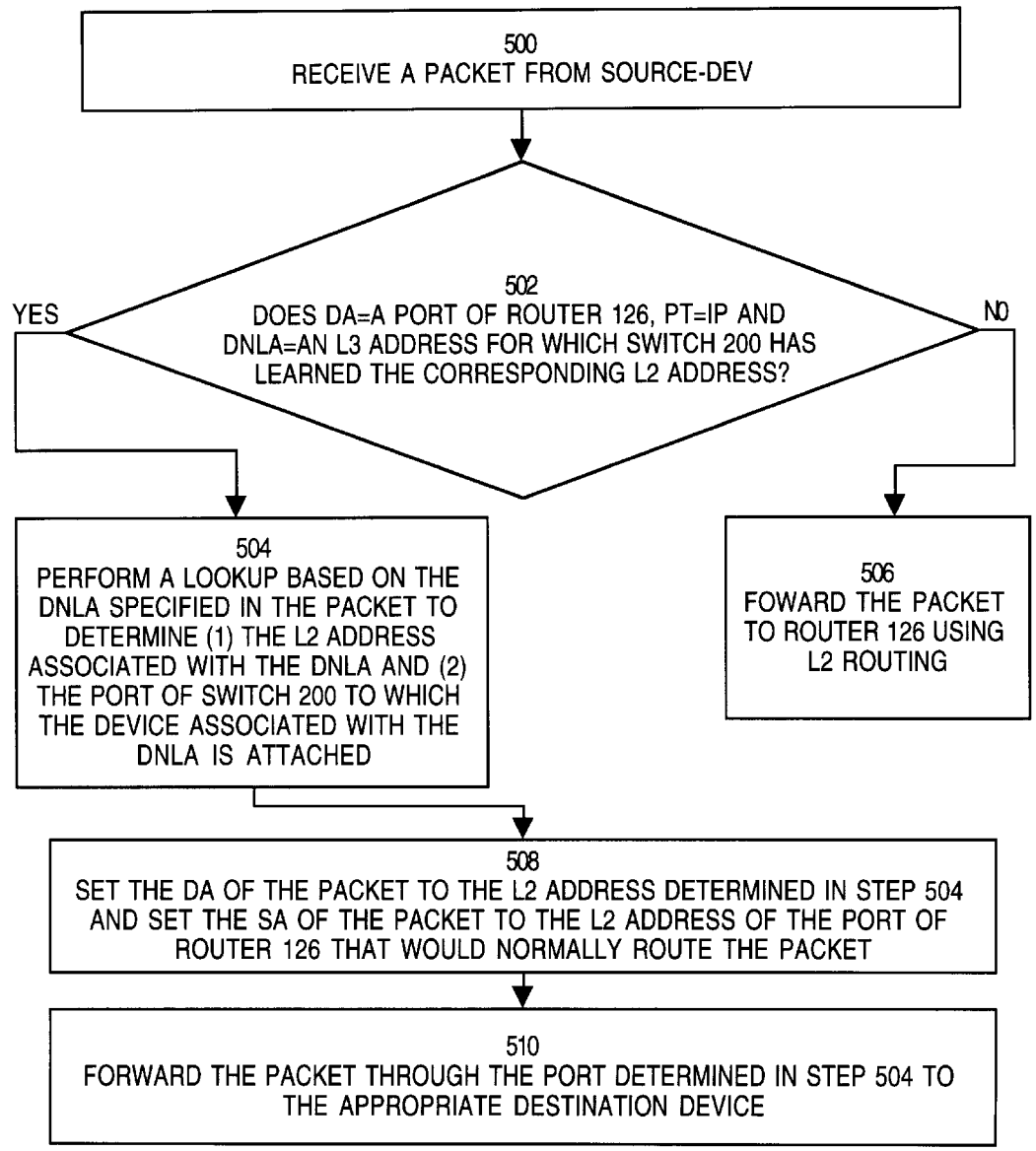
FIG. 5 is a flow chart illustrating the steps performed by a learning internetwork switch to perform proxy forwarding according to an embodiment of the invention.

Having acquired the information described above, learning internetwork switch 200 has all of the information necessary to forward all future packets sent between SOURCE-DEV and DEST-DEV without involving router 126 in the forwarding process. FIG. 5 is a flow chart illustrating the steps performed by learning internetwork switch 200 in the proxy forwarding process.

Referring to FIG. 5, at step 500 learning internetwork switch 200 receives a packet from SOURCE-DEV. At step 502, learning internetwork switch 200 reads the DA, the DNLA and the PT of the packet. If the DA is a port of router 126, the PT is IP and the DNLA is an L3 address for which learning internetwork switch 200 has learned the corresponding L2 address, then control passes to step 504. Otherwise, control passes to step 506, where the packet is forwarded to router 126 using L2 forwarding.

At step 504, learning internetwork switch 200 does a lookup based on the DNLA specified in the packet to determine (1) the L2 address associated with the DNLA and (2) the port of learning internetwork switch 200 to which the device associated with the DNLA is attached. At step 508, learning internetwork switch 200 sets the DA of the packet to the L2 address determined in step 504. Learning internetwork switch 200 also sets the SA of the packet to the L2 address of the port of router 126 that would normally route the packet. At step 510, learning internetwork switch 200 uses L2 routing to forward the packet through the port determined in step 504 to the appropriate destination device.

Assuming that the packet is a subsequent message from client 114 to server 104, learning internetwork switch 200 would do a lookup based on the L3 address of server 104 to determine (1) the L2 address of server 104 and (2) that server 104 is attached to port 204. At step 508, learning internetwork switch 200 would set the DA of the packet to the L2 address of client 114, and set the SA of the packet to the L2 address of port 130. At step 510, learning internetwork switch 200 would use L2 routing to forward the packet through port 204 to server 104.

OPERATION OF LEARNING INTERNETWORK SWITCH 200

The operation of learning internetwork switch 200 has been described above in the context of an single inter-VLAN communication. However, at any given time numerous packets from numerous different devices may be passing through learning internetwork switch 200. The manner in which learning internetwork switch 200 processes the packets shall be described in detail below with reference to FIGS. 6a and 6b.

Figure 6A:
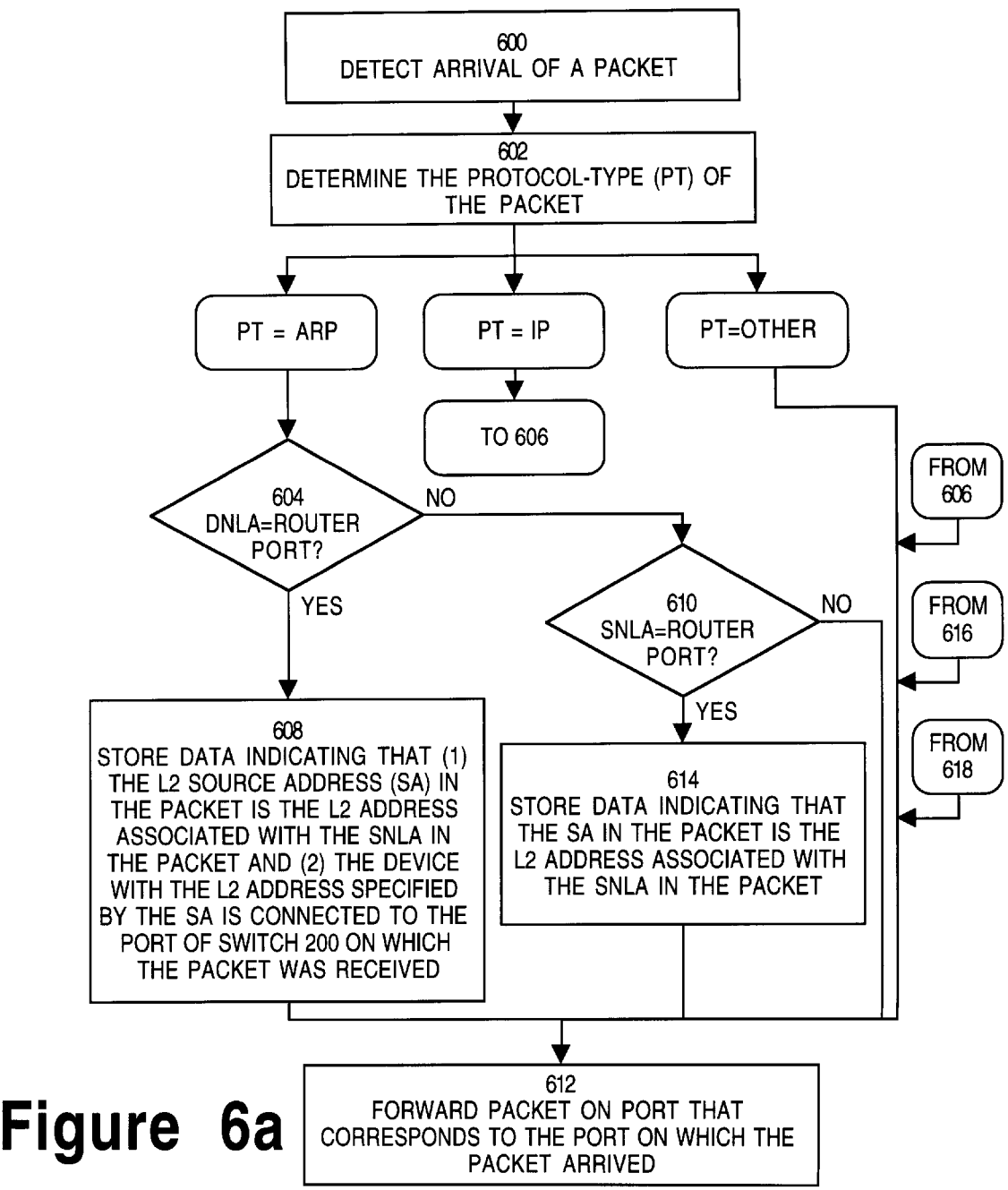
FIG. 6a is a portion of a flow chart illustrating the steps performed by a leaning internetwork switch upon detecting the arrival of a packet.
Figure 6B:
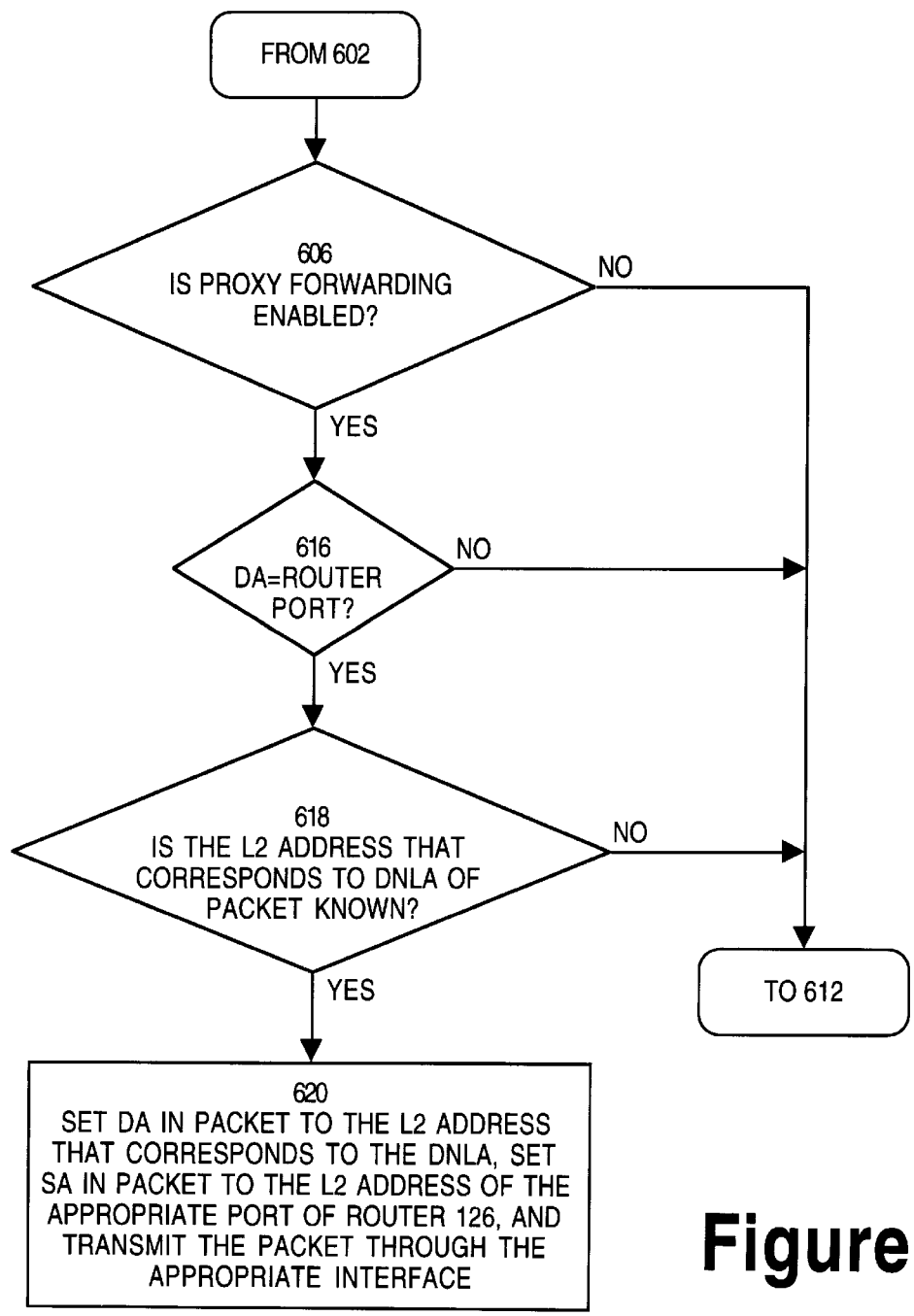

Referring to FIGS. 6a and 6b, learning internetwork switch 200 detects the arrival of a packet (step 600). At step 602, learning internetwork switch 200 determines the protocol-type (PT) of the packet. If the PT is ARP, control passes to step 604. If the PT is IP, then control passes to step 606. If the PT is any other type of protocol, control passes to step 612.

At step 604, learning internetwork switch 200 determines whether the L3 destination address (DNLA) of the packet is the L3 address of a port of router 126. If the DNLA is the L3 address of a port of router 126, then control passes to step 608. Otherwise, control passes to step 610.

At step 608, learning internetwork switch 200 stores data indicating that (1) the L2 source address (SA) in the packet is the L2 address associated with the SNLA in the packet and (2) the device with the L2 address specified by the SA is connected to the port of learning internetwork switch 200 on which the packet was received. Control then proceeds to step 612.

At step 610, learning internetwork switch 200 determines whether the SNLA of the packet is the L3 address of a port of router 126. If the SNLA of the packet is the L3 address of a port of router 126, then control passes to step 614. At step 614, learning internetwork switch 200 stores data indicating that the SA in the packet is the L2 address associated with the SNLA in the packet. If the SNLA of the packet is not the L3 address of a port of router 126, then control passes from step 610 to step 612.

At step 612, learning internetwork switch 200 forwards the packet without change to the port that corresponds to the port on which the packet arrived. For example, if the packet arrived at port 202, learning internetwork switch 200 would forward the packet through the port connected to port 128. Similarly, if the packet arrived from port 128, learning internetwork switch 200 would forward the packet through the port 202.

At step 606, learning internetwork switch 200 determines whether proxy forwarding is enabled. If proxy forwarding is enabled, control passes to step 616. If proxy forwarding is not enabled, control passes to step 612.

At step 616, learning internetwork switch 200 determines whether the DA in the packet is the L2 address of a port of router 126. If the DA in the packet is the L2 address of a port of router 126, then control passes to step 618. Otherwise, control passes to step 612.

At step 618, learning internetwork switch 200 determines whether the L2 address that corresponds to the DNLA of the packet is known. Learning internetwork switch 200 will have stored data indicating a correspondence between an L2 address and the DNLA if in inter-VLAN communication between the source and destination devices in question has already occurred. If the L2 address that corresponds to the DNLA of the packet is known, then control passes to step 620. Otherwise, control passes to step 612.

At step 620, learning internetwork switch 200 sets the DA in the packet to the L2 address that corresponds to the DNLA specified in the packet. Learning internetwork switch 200 also sets the SA in the packet to the L2 address of the router port that would normally have sent the packet. The learning internetwork switch 200 then transmits the packet directly to the destination device using L2 forwarding by sending the packet through the port to which the destination device is attached. If learning internetwork switch 200 knows the L2 address associated with the DNLA, then learning internetwork switch 200 will also know the port to which the device corresponding to the DNLA is connected (see step 608).

Significantly, all of the operations performed by learning internetwork switch 200 are completely transparent to all other devices in the network system 100. Thus, the use of learning internetwork switch 200 to perform proxy forwarding would not require any change in the addressing scheme used by network system 100. Further, learning internetwork switch 200 learns the addresses and locations of devices by inspecting certain packets that flow through learning internetwork switch 200. As a result, learning internetwork switch 200 does not have to participate in routing protocols which may vary from network to network. In addition, operation at L2 of the VLANs that are locally attached to learning internetwork switch 200 remains unchanged.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A learning internetwork switch for use in a network that includes a plurality of virtual local area networks, the learning internetwork switch comprising:

a first set of ports connecting the leaning internetwork switch to a set of virtual local area networks, wherein each virtual local area network of the set of virtual local area networks is a virtual local area network of the plurality of virtual local area networks that is locally attached to the learning internetwork switch;

a second set of ports connecting the learning internetwork switch to a router, wherein devices that belong to the virtual local area networks in the set of virtual local area networks communicate with the router by transmitting packets through the learning internetwork switch;

a learning mechanism that inspects control packets sent between the router and the devices, the learning mechanism storing association data that indicates a correspondence between data link layer addresses, network layer addresses, and the first set of ports based on information contained in the control packets; and said learning internetwork switch using said association data to forward traffic between locally attached virtual local area networks.

2. The learning internetwork switch of claim 1 wherein:

a third set of ports on the router connect the router to the second set of ports; and the learning mechanism is further configured to store data indicating a correspondence between data link layer addresses of the third set of ports and network layer addresses of the third set of ports based on information contained in the control packets.

3. The learning internetwork switch of claim 1 further including a proxy forwarding mechanism configured to:
 detect when a packet sent by a first device of a first virtual local area network in the set of virtual local area networks contains a data link layer destination address associated with the router and a network layer destination address associated with a second device of a second virtual local area network in the set of virtual local area networks;
 determine the data link layer address of the second device based on the network layer address of the second device;
 replace in the packet the data link layer destination address associated with the router with the data link layer address associated with the second device; and
 transmit the packet through the port of the first set of ports to which the second device is connected.

4. The learning internetwork switch of claim 1 wherein:
 the control packets include packets which are request packets that request a data link layer address of a port of the router; and
 the request packets contain a data link layer source address associated with the device sending the packet, a network layer source address associated with the device sending the packet, and a network layer destination address associated with the port of the router.

5. The learning internetwork switch of claim 3 wherein:
 the packet includes a data link layer source address associated with the first device; and
 the proxy forwarding mechanism is further configured to:
  determine a data link layer address associated with a port of the router which serves as a default gateway to the second virtual local area network; and
  replace in the packet the data link layer source address associated with the first device with the data link layer address associated with the port of the router which serves as the default gateway to the second virtual local area network.

6. A method, for use by a learning internetwork switch connected to a router, for determining locations of devices that belong to a set of virtual local area networks locally attached to the learning internetwork switch, the method comprising:
 receiving at a first port a packet from a device that belongs to one of the virtual local area networks, the packet includes a network layer destination address that corresponds to a particular port of the router; and
 determining whether the packet is a request for the data link layer address of the particular port of the router;
 if the packet is a request for the data link layer address of the particular port of the router, then
  reading a data link layer source address and a network layer source address from the packet,
  storing data indicating that the data link layer source address corresponds to the network layer source address,
  storing data indicating that the device that originally transmitted the packet is connected to the first port,
  forwarding the packet to the particular port of the router.

7. The method of claim 6 further comprising:
 if the packet contains a message to be sent through the router to a second device that belongs to a second virtual local area network of the set of virtual local area networks, then:
  reading from the packet a network layer destination address associated with the second device, and
  performing a lookup operation to determine if configuration information has been stored for the network layer destination address;
  if configuration information has been stored for the network layer destination address, then reading the configuration information to determine a data link layer address of the second device and that the second device is connected to a second port of the learning internetwork switch; and
  forwarding the packet to the second device through the second port.

8. The method of claim 7 wherein forwarding the packet comprises:
 replacing, in the packet, a data link layer destination address associated with the router with the data link layer address associated with the second device; and
 replacing, in the packet, a data link layer source address associated with the device with a data link layer address associated with a port of the router that is connected to the second virtual local area network.

9. The method of claim 7 further comprising forwarding the packet to the router if configuration information has not yet been stored for the network layer destination address.

10. The method of claim 7 further comprising determining whether proxy forwarding is active, and forwarding the packet to the second device through the second port only if proxy forwarding is active.

11. The method of claim 6 further comprising:
 receiving from the router a response packet to the packet, the response packet including a data link layer address associated with the particular port of the router;
 inspecting the response packet to determine the data link layer address associated with the particular port of the router;
 storing data that indicates that the data link layer address of the particular port corresponds to the network layer address of the particular port; and
 forwarding the response packet to the device through the first port.

12. The method of claim 11 further comprising storing data that indicates that the virtual local area network is connected to the particular port based on information contained in the response packet.

13. A method, for use by a learning internetwork switch, for performing proxy forwarding between a first device on a first virtual local area network and a second device on a second virtual local area network, where the first virtual local area network and the second virtual local area network are locally attached to the learning internetwork switch, the method comprising:
 receiving a packet from the first device that specifies a network layer destination address and a data link layer destination address, wherein the specified network layer destination address is a network layer address associated with the second device and the data link layer destination address is a data link layer address associated with a first port of a router connected to the learning internetwork switch;
 performing a lookup operation to determine a data link layer address associated with the second device;

if the data link layer address associated with the second device is found during the lookup operation, then changing the data link layer destination address specified in the packet to the data link layer address associated with the second device, and forwarding the packet to the second device over the second virtual local area network.

14. The method of claim 13 further comprising:

changing data link layer source address specified in the packet to a data link layer address associated with the second port prior to forwarding the packet to the second device.

15. The method of claim 13 further comprising learning a location of the second device prior to receiving from information contained in a previous packet transmitted by the second device.

16. The method of claim 15 wherein the learning of the location includes:

receiving at a particular port of the learning internetwork switch the previous packet;

determining that the previous packet is addressed to a particular port of the router;

reading a data link layer source address and a network layer source address from the previous packet;

storing data that indicates that the data link layer source address is the data link layer address associated with the network layer source address;

storing data that indicates that the device associated with the network layer source address is connected to the particular port of the leaning internetwork switch and;

storing data that indicates that the device associated with the network layer source address is connected to the particular port of the router.

* * * * *